United States Patent [19]

Kaczmarczyk et al.

[11] Patent Number: 5,135,347

[45] Date of Patent: Aug. 4, 1992

[54] LOADER MOUNTING

[76] Inventors: Edward T. Kaczmarczyk, 5 Stanley St., Welland, Ontario L3B-5N2, Canada; Rory Rae, 40 Gaspare Ave., Port Colborne, Ontario L3K-2V2, Canada; Mervin P. Kizlyk, 10 Sherwood Forest Tr, Welland, Ontario L3B-5N2, Canada

[21] Appl. No.: 502,071

[22] Filed: Mar. 30, 1990

[51] Int. Cl.⁵ .................................... E02F 3/627
[52] U.S. Cl. .......................... 414/686; 172/274
[58] Field of Search ............... 414/686, 723; 172/272, 172/273, 274

[56] References Cited

U.S. PATENT DOCUMENTS

| | | | |
|---|---|---|---|
| 4,043,470 | 8/1977 | Pilch | 414/686 |
| 4,217,075 | 8/1980 | Frank | 414/686 |
| 4,247,242 | 1/1981 | Goertzen | 414/686 |
| 4,343,389 | 8/1982 | Ponstein | 414/686 X |
| 4,355,945 | 10/1982 | Pilch | 414/686 |
| 4,548,543 | 10/1985 | Lenertz et al. | 414/686 |
| 4,936,737 | 6/1990 | Rae et al. | 414/686 |
| 4,984,958 | 1/1991 | Kaczmarczyk | 414/723 |

FOREIGN PATENT DOCUMENTS

| | | |
|---|---|---|
| 3229947 | 2/1984 | Fed. Rep. of Germany . |
| 3831212 | 3/1990 | Fed. Rep. of Germany . |
| 0190843 | 11/1982 | Japan ........................... 414/723 |
| 966194 | 8/1964 | United Kingdom ............... 414/686 |

Primary Examiner—Robert J. Spar
Assistant Examiner—William M. Hienz

[57] ABSTRACT

A loader mounting arrangement includes a pair of mounting frames secured to the opposite sides of the tractor frame for receiving the lower ends of the loader mast posts. Each bracket includes a transversely extending pin for receiving a C-shaped forwardly opening front portion of the mast post. The rear of the mounting frame opens upwardly to guide the aft portion of the mast post end as the mast post is rocked downwardly about the axis of the rod. Projecting pin-receiving bushings in the aft portion of the mast post end are received within mating upwardly opening pockets in the mounting frame. The bushings are positively forced into the pockets by operating the boom lift cylinders with the loader attachment on the ground to assure alignment of the mast post end and the bracket. With the bushings forced downwardly into the fully seated position within the pockets, hole in the bracket are aligned with the bushing bores, and a locking pin is easily inserted to secure the mast post to the tractor.

8 Claims, 5 Drawing Sheets

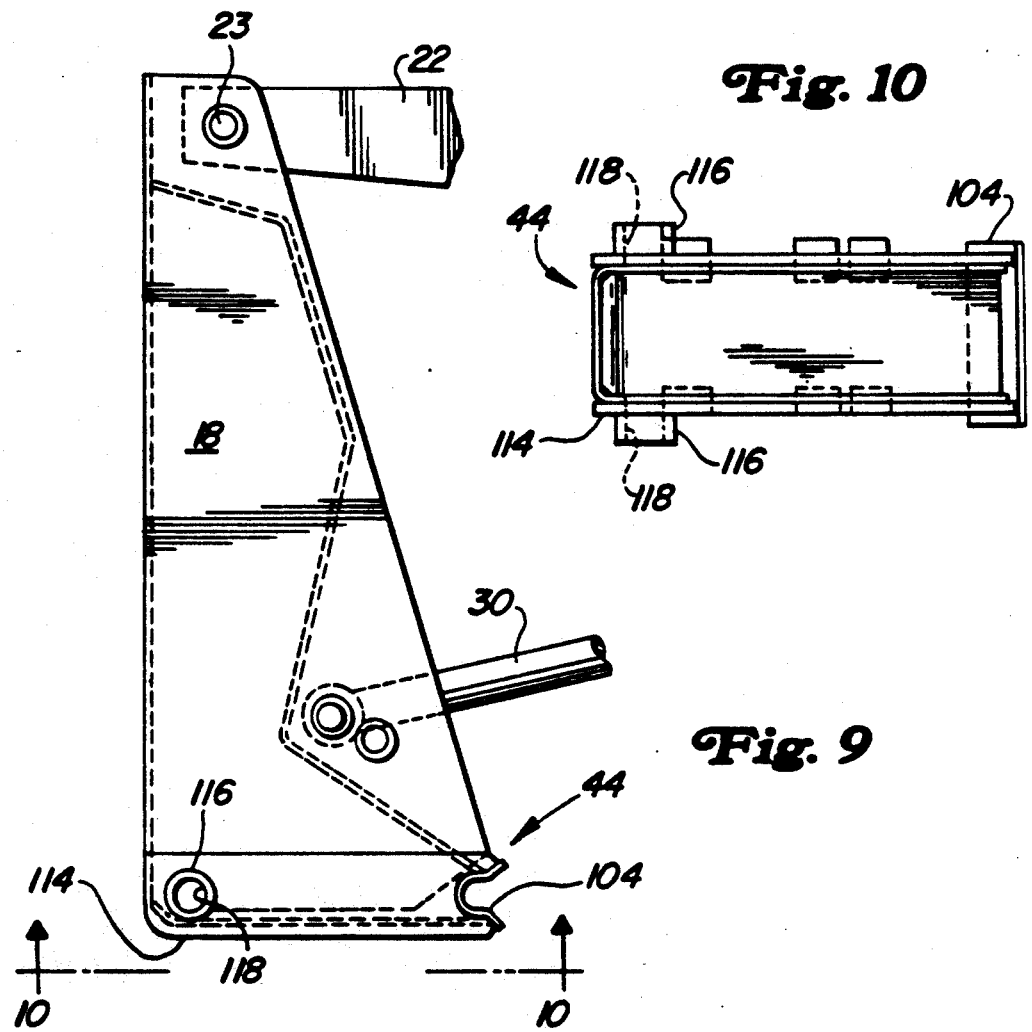
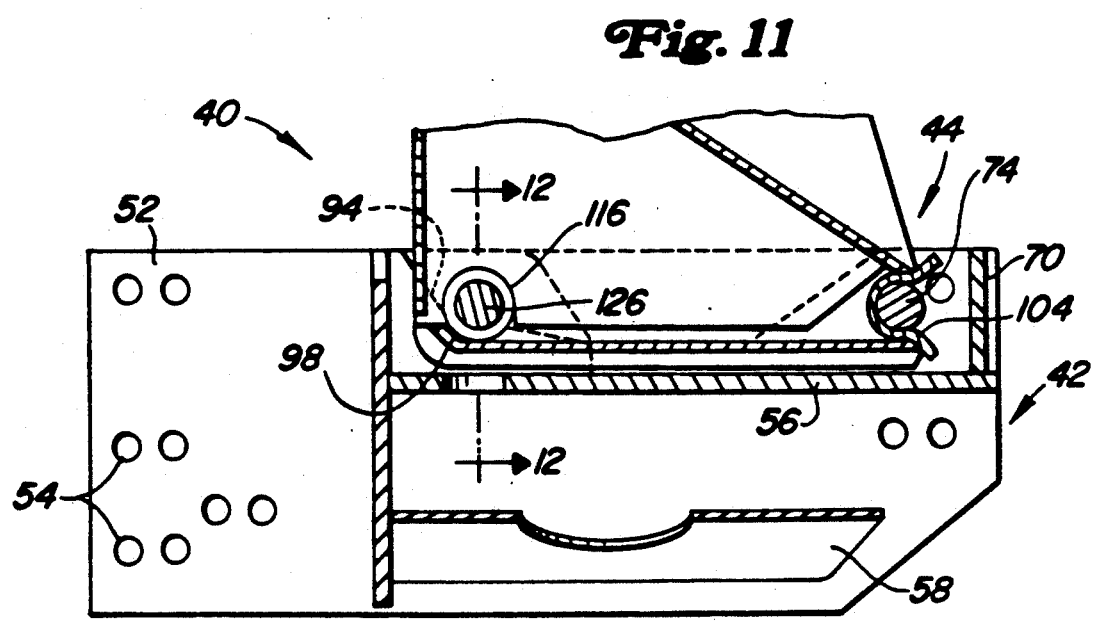

LOADER MOUNTING

BACKGROUND OF THE INVENTION (1) Field of the Invention

The present invention relates generally to loaders which are attached to the front end of a tractor, and more specifically to a loader mounting arrangement for facilitating quick mounting and dismounting and assuring a tight fit between the loader and the tractor.

(2) Related Art

Many types of loader mounting arrangements are available which allow an operator to easily attach a loader to a tractor and to quickly remove the loader to free up the tractor for other uses. However, most require tools, wedges or adjustments to properly align mating portions on the loader and tractor during mounting and to provide a close fit to facilitate locking pin insertion and to reduce looseness and vibrations. A close, tight fit is especially important with smaller loaders which do not have widely spaced attaching points for support so that any looseness at the mounting is greatly magnified at the attachment. An example of such a mounting arrangement is shown in U.S. Pat. No. 4,247,242 wherein a threaded member is utilized to wedge a mounting foot into engagement with beveled surfaces on a support bracket. Providing such adjusting members increases the cost and complexity of the device and increases the time necessary to mount and dismount the loader.

Some wedging arrangements can cause unwanted forces and shifting of the loader frame during operation. In addition, support brackets and mating mast members on many of the available devices with pins, wedges or shims require close tolerance manufacture and, as a result, are expensive and prone to being rendered inoperative by the harsh environment common in loader operations. If locking pins are used and a tight fit is to be maintained without adjustable brackets, insertion and removal of the pins often is difficult and requires much force.

BRIEF SUMMARY OF THE INVENTION

It is therefore an object of the present invention to provide an improved mounting arrangement and method for attaching a loader. It is another object of the invention to provide such an arrangement and method which overcome the aforementioned problems.

It is still another object to provide an improved mounting arrangement for a loader which is easy to use and provides a tight fit between the loader and tractor without need for tools, shims, wedges or special adjustment features that would add to the cost and/or complexity of the loader. It is another object to provide such a structure which utilizes an easily insertible and removable locking pin.

It is yet another object to provide a loader mounting arrangement which may be manufactured to larger tolerances than at least most loader mounting arrangements heretofore available. It is another object to provide such an arrangement which is particularly useful for loaders which do not have widely spaced mounting points.

It is still a further object of the invention to provide an improved mounting method and structure for a loader which positively locates the loader mast posts with respect to the mounting hardware on the tractor so that the loader can be easily pinned or bolted to the tractor and unwanted forces on the connecting area are reduced or eliminated. It is still another object of the invention to provide such a mounting method and structure which advantageously uses the loader cylinders to align pin-receiving apertures for easy insertion and removal of the locking device during mounting and dismounting.

A loader mounting arrangement constructed in accordance with the present invention includes a pair of mounting frames secured to the opposite sides of the tractor frame for receiving the lower ends of upright mast posts on a loader. Each bracket includes a transversely extending pin for receiving a forwardly opening front portion of the mast post. The rear of each mounting frame opens upwardly to guide the aft portion of the mast post end as the mast post is rocked downwardly about the axis of the rod. Projecting pin-receiving bushings in the aft portion of the mast post end are received within mating upwardly opening pockets. The bushings are positively forced into the pockets by operating the hydraulic boom cylinder with the loader attachment on the ground. The large mechanical advantage achieved by pivoting the mast about the rod using the boom cylinder assures positive alignment of the mast post end and the bracket. With the bushings forced downwardly into the fully seated position within the pockets, holes in the bracket are aligned with the bushing bores, and a locking pin is easily inserted to secure the mast post to the tractor. A tight fit between the mast post end and the bracket results without need for close manufacturing tolerances. Wedges, shims, threaded adjusting devices or other such additional members are unnecessary for a strong, tight fit; tools are not required for mounting or dismounting the loader. The pockets are shaped to positively locate the bushings and prevent unwanted forces and shifting at the mast post ends, even under heavy loading during loader operation. During dismounting of the loader, the bushings are again forced downwardly into the pockets so that the pin can be removed with very little force and without tools. Since no threading adjustments or shim or wedge manipulation or the like is required, both loader mounting and dismounting can be completed in less time than required with many previously available mounting arrangements.

These and other objects, features and advantages of the present invention will become apparent to one skilled in the art upon reading the following detailed description in view of the drawings.

BRIEF DESCRIPTION OF THE DRAWINGS

FIG. 9 is an enlarged side view of the mast post on the loader of FIGS. 1-6.

FIG. 10 is a view taken essentially along lines 10—10 of FIG. 9.

FIG. 11 is a front sectional view of the bracket and the mast post end with the loader mounted on the tractor.

DETAILED DESCRIPTION OF THE DRAWINGS

Figure 1:
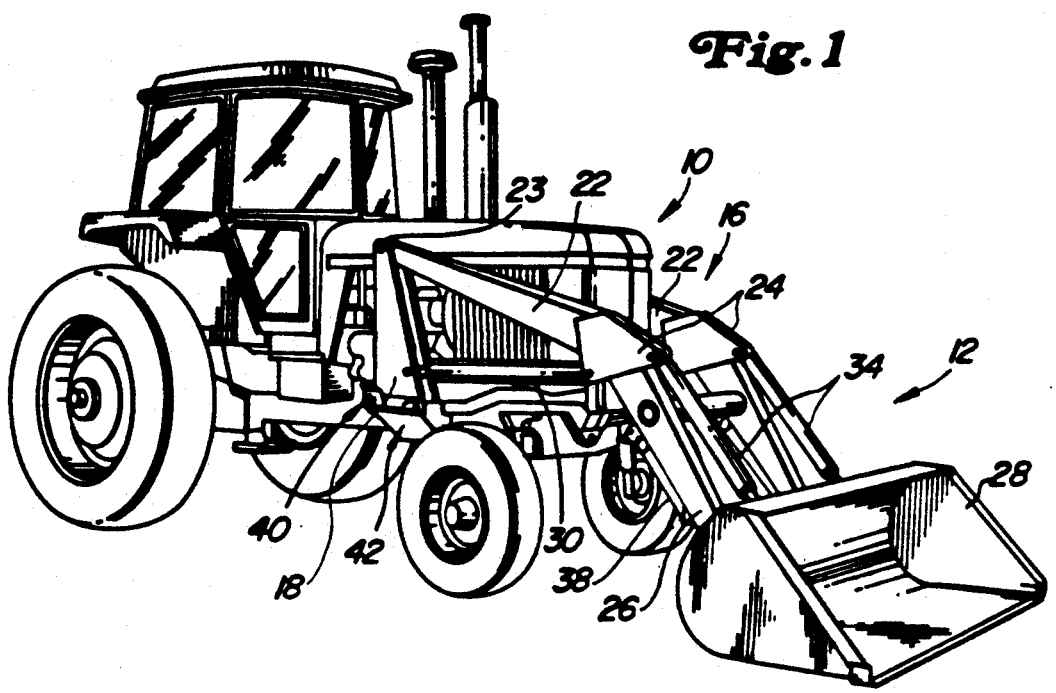
FIG. 1 is a perspective view of a tractor with a loader.

Referring now to FIG. 1, therein is shown a tractor 10 having a loader 12 mounted thereon. The loader 12 includes a mast 16 pivotally connected to upright mast posts 18 for rocking in a conventional manner about a transverse axis by boom cylinders 20. The mast includes a pair of transversely spaced boom arms 22 pivotally connected at locations 23 to the posts 18. The arms 22 extend forwardly from the mast posts 18 to knee joints 24. The arms 22 extend downwardly from the joints 24 to lower, forward attachment mounting ends 26. An attachment 28 is connected the ends 26. Boom cylinders 30 are connected between the lower ends of the mast posts 18 and the joints 24 to rock the arms 22 vertically about the pivotal locations 23. Cylinders 34 connected between the joints 24 and the attachment 28 rock the attachment about pivots 36 to various park and operating positions. Parking stands 38 are pivotally connected to the boom arms 22 below the joints 24 for rocking between raised operating positions (FIG. 1) closely adjacent the boom arms and park positions (FIG. 2) angled rearwardly from boom arms. With the stands 38 pinned in the park positions, the unmounted loader 12 is free-standing and is supported entirely by the stands and the attachment 28 (FIGS. 2 and 3).

As shown in FIG. 1, the loader 12 is a front end loader, and the attachment 28 is a loader bucket. However, it is to be understood that the present invention may be used with other types of vehicles and boom-mounted attachments.

Side mountings indicated generally at 40 in FIG. 1 releasibly secure the loader 12 to the tractor 10 at localized attaching areas on each side of the tractor frame and facilitate mounting and removal of the loader. The mountings 40 include, at each side of the tractor, a mounting frame or weldment 42 (FIG. 2) connected to the tractor frame and a mating lower mast frame end 44. Since the mounting 40 on the left side of the tractor 10 is substantially the mirror image of the mounting on the right side of the tractor, only the right side mounting 40 will be described in detail.

Figure 2:
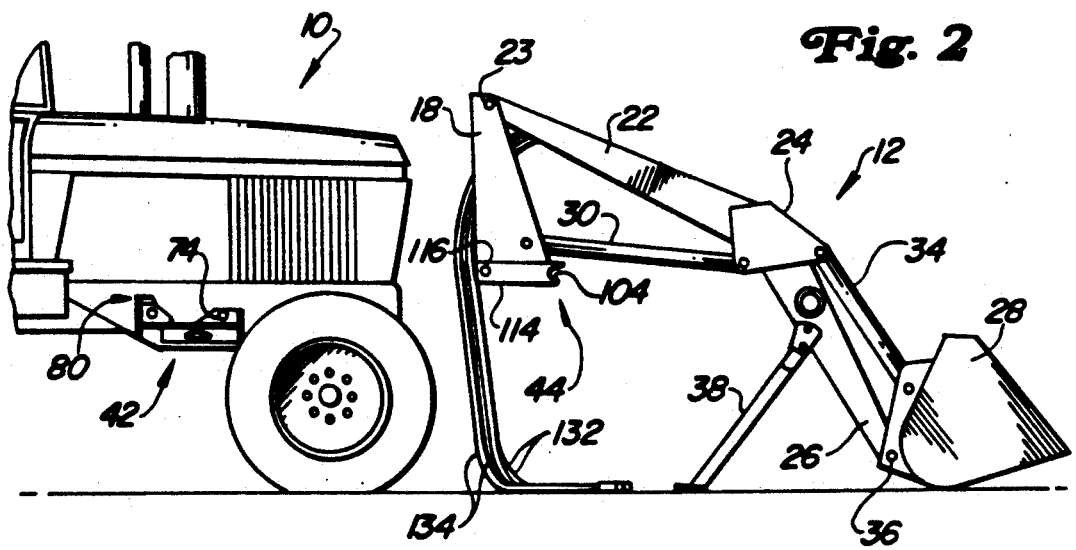
FIG. 2 is a side view of the tractor with the loader in the parked position.
Figure 3:
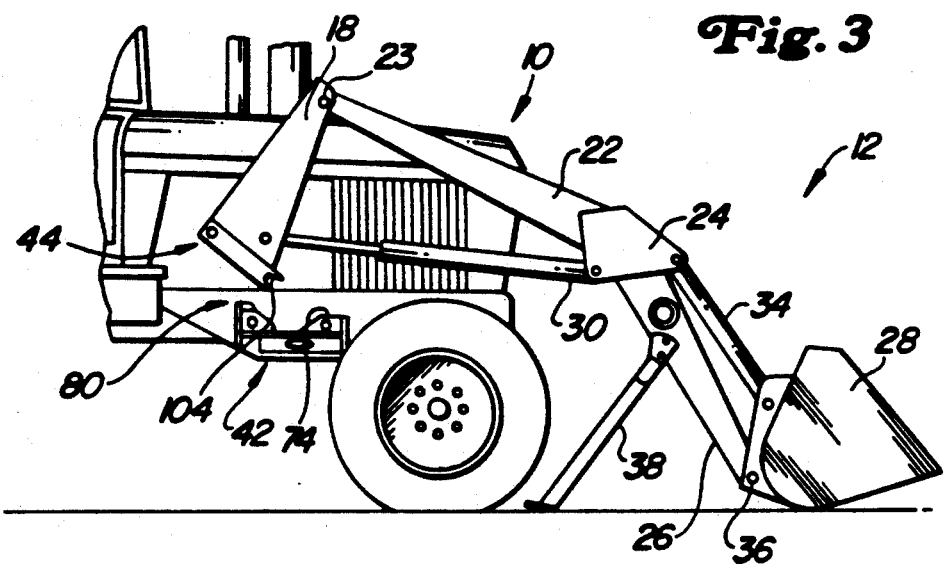
FIG. 3 is a side view of the tractor and loader positioned so that the lower end of the mast post can be received within the mounting frame fixed to the tractor.

The mounting frame or weldment 42 (see FIGS. 6-8 and 11-13) includes an upright mounting plate 52 with apertures 54 for attaching the frame 42 rigidly to the side of the tractor frame at a location just behind the front tractor wheels (FIG. 2). A horizontal base plate 56 is welded to and extends outwardly from the plate 52. A diagonal brace 58 extends upwardly and outwardly from the lower end of the plate 52 to a connection with the outer edge of the base plate 56. An aft wall 64 is welded to the plates 52 and 56 to form a strong and rigid support structure.

Figure 6:
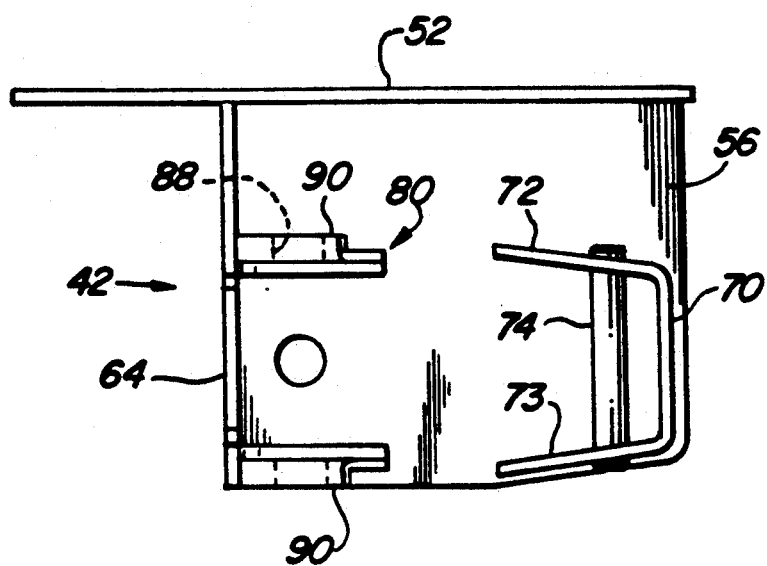
FIG. 6 is a top view of the bracket.
Figure 7:
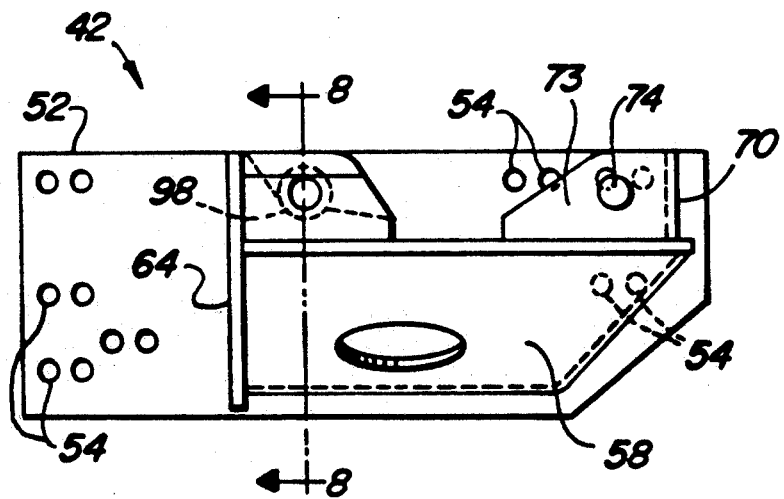
FIG. 7 is a side view of the bracket of FIG. 6.
Figure 8:
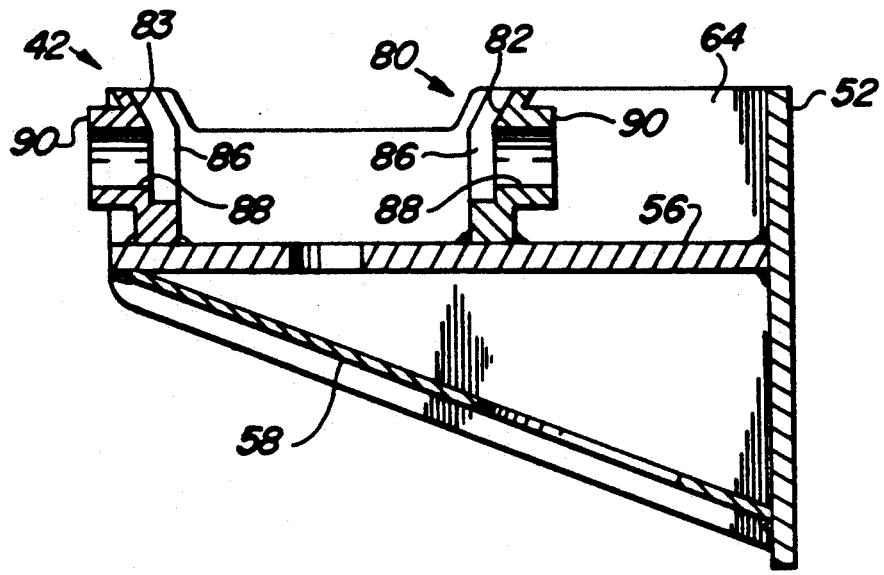
FIG. 8 is an enlarged front sectional view of the bracket taken essentially along lines 8—8 of FIG. 7.

Welded to the base plate 56 of the frame 42 is a rearwardly opening, U-shaped member 70 (FIGS. 6, 7 and 11). The member 70 includes a pair of rearwardly diverging plates 72,73 which open upwardly and rearwardly and support a transversely extending pin or shaft 74 therebetween above the base plate 56. The plates 72,73 are so dimensioned and located to receive the forward portion of the lower mast end 44 and guide the end into close engagement with the pin 74 during mounting of the loader, as will be described in detail below.

Locating ramp structure 80 including a pair of machined ramps 82,83 is welded to the base plate 56 and the rear wall 64 for receiving the aft end of the lower mast end 42 during mounting. The ramps 82,83 are generally mirror images of each other and include an upright outer wall 84 and an inner ramp surface 86. A bore 88 is located in the outer wall 84 and extends through a bushing 90 welded to the outside of the wall. The uppermost portions of the walls 84 diverge outwardly in the upward direction to help channel the mast lower end 44 into position during mounting.

Figure 13:
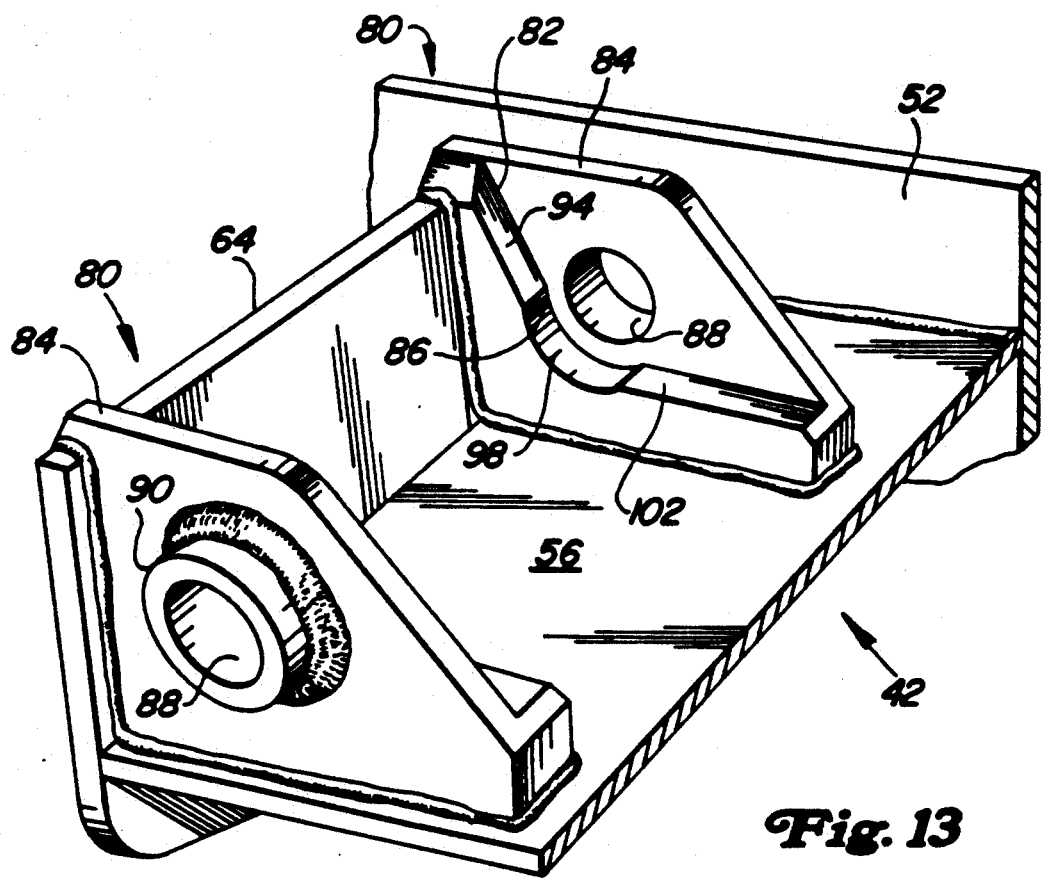
FIG. 13 is a perspective view of the rear portion of the bracket of FIG. 6.

The ramps 82,83 each include an inclined rear portion 94 which is angled from the rear wall 64 towards the aperture 88 and leads into a rounded pocket 98. Each pocket 98, which as best seen in FIG. 13 opens upwardly and slightly forwardly to form the lowermost extremity of the ramp surface 86, is struck on the arc of a circle having a radius which has a center substantially lying on the axis of the bore 88. The ramp surface 86 extends forwardly at 102 from the pocket 98 slightly above the lowermost extremity of the pocket.

The lower mast end 44 includes a forwardly opening channel 104 with a C-shaped cross-section which is adapted for receipt over the pin 74 between the plates 72,73 and defines the pivotal axis of the loader 12 during portions of the mounting and dismounting procedure. The channel 104 is flared outwardly in the forward direction to help guide the forward end of the lower mast end 44 into registry with the pin 74 during mounting. The channel 104 is urged forwardly to fit snugly against the pin 74 and between the plates 72,73 to resist both fore-and-aft and lateral movement when the loader is fully mounted.

The lower mast end 44 also includes an apertured aft portion 114 having reinforced mast pin bushings or post supports 116 projecting transversely from the sides of the mast post 18. The width of the aft portion 114 at the bushings is approximately equal to the distance between the inwardly facing portions of the walls 84 of the locating ramp structure 80. The outer diameter of each of the bushings 116 is equal to the diameter of the corresponding pocket 98. The bushings 116 have bores 118 which are equal in diameter to the diameter of the bores 88 in the bushings 90. When the bushings 116 are fully seated within the pockets 98, the bores 88 and 118 are fully aligned for easy insertion and removal of a locking pin 126, as will be described in further detail below. The ramp portions 94 urge the lower mast frame ends forwardly as the bushings 116 are rocked downwardly to the pockets 98 to assure firm contact between the locating pin 74 and the channel 104 when the loader is in the final mounted position.

Figure 12:
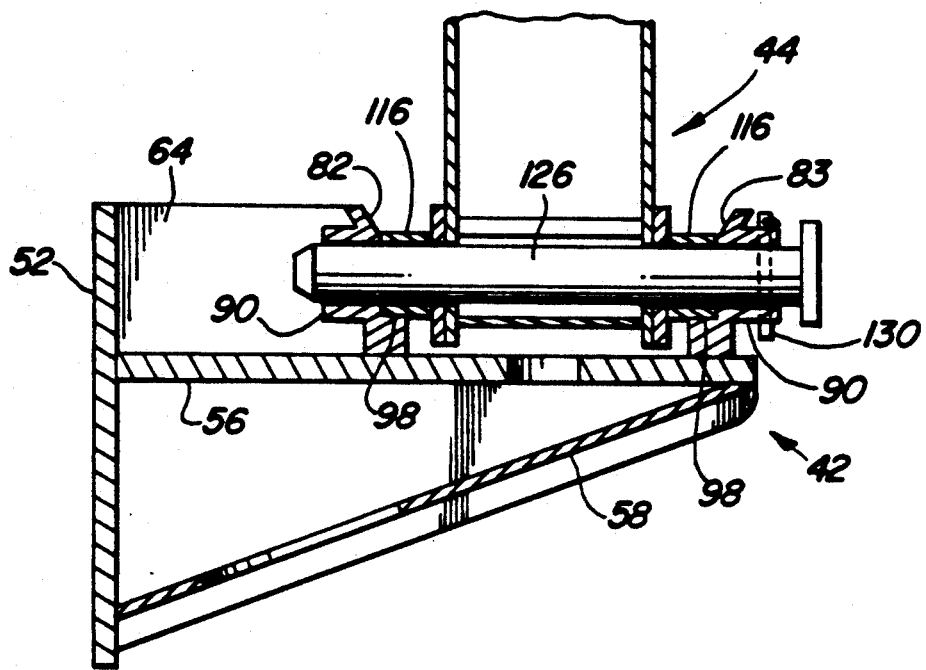
FIG. 12 is an enlarged perspective view of the rear portion of the bracket showing the configuration of the locating pocket.

As best seen in FIGS. 11 and 12, when the loader 12 is mounted with the locking pin 126 inserted, the lowermost edge of the aft portion of the lower mast end 44 is supported slightly above the support plate 56 by the ramp structure 80. The pin 126 and the outer bushing 90 are apertured (FIG. 12) to receive a keeper pin 130 which secures the pin 126 in position during loader operation.

The above-described construction of the lower mast end 44 and support frame 42 provides a very tight and strong mounting for loader. As can be appreciated from FIGS. 5 and 11, for example, the large moments encountered during loader operation are substantially absorbed by the frame 42 and end 44 which define a moment arm (approximately equal to the distance between the pins 74 and 126) which is only a small fraction (i.e., on the order of less than about one-fifth) of the moment arm defined between the end of the attachment 28 and the mounting 40. Therefore, it is evident that any movement caused by looseness in the mounting would be greatly magnified at the attachment. The ramp and pocket arrangement minimizes looseness while providing positive bore alignment utilizing loader hydraulics, for easy insertion and removal of the locking pin 126 without wedges or adjustments.

Attaching the Loader

With the loader 12 in the position shown in FIG. 2, the tractor 10 is driven forward between the mast posts 18 until the rear mast pin bushing 116 is over the mounting frame 42. The tractor is placed in the park position with the engine turned off. Hydraulic hoses 132 and 134 connected to the cylinders 30 and 34 are attached to the hydraulic system (not shown) of the tractor 12 for operating the cylinders. The tractor engine is started and the boom cylinders 30 are extended to pivot the posts 18 about the locations 23 until each channel 104 is just above the corresponding mounting frame 40 (FIG. 3). The attachment cylinders 34 are then extended to cause the loader to rock about feet of the parking stands 38 so that the mast end 44 drops into the frame 42 and is guided into the proper transverse position by the sidewalls 84.

Figure 4:
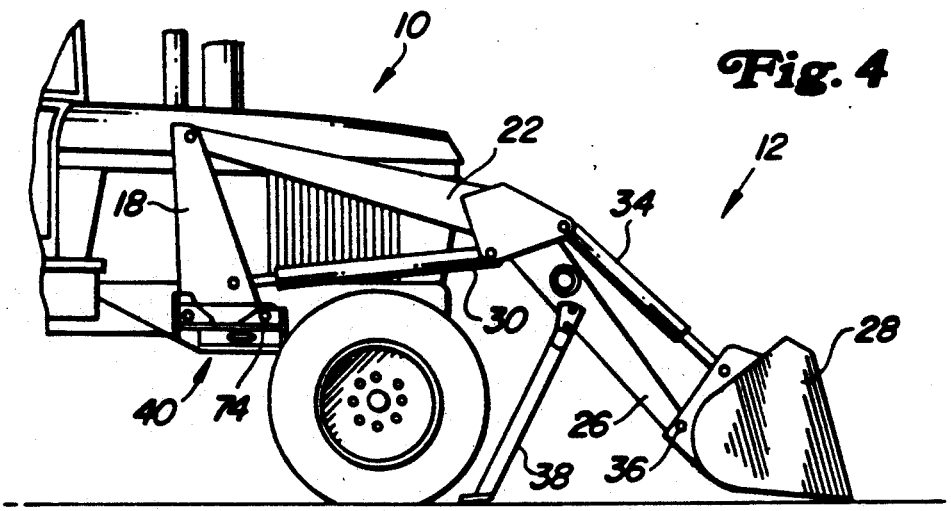
FIG. 4 is a view similar to FIG. 3 but showing the mast post lowered onto the bracket.

Once in the frame 42, the mast end 44 is moved forwardly by retracting the cylinders 30 (FIG. 4), and the channel 104 is guided onto the pin 74 by the plates 72,73. The cylinders 30 are retracted until the forwardly opening pocket of the channel 104 is located against the pin 74. With the channel 104 on the pin 74, the attachment cylinders 34 are extended (FIG. 5) to move the attachment 28 down from the horizontal position. The boom cylinders 30 are then retracted to lift the weight from the front tractor tires. This forces the aft end 114 of the mast end 44 to rotate downwardly about the axis of the pin 74 until the bushings 116 have moved completely down the ramp surfaces 86 and are fully seated within the pockets 98. With the engine turned off and the tractor in park, the pins 126 are inserted through the respective bushings 90 to secure the loader 12 to the tractor 10. The stands 38 are raised and pinned in their retracted positions (FIG.1).

Parking the Loader

Figure 5:
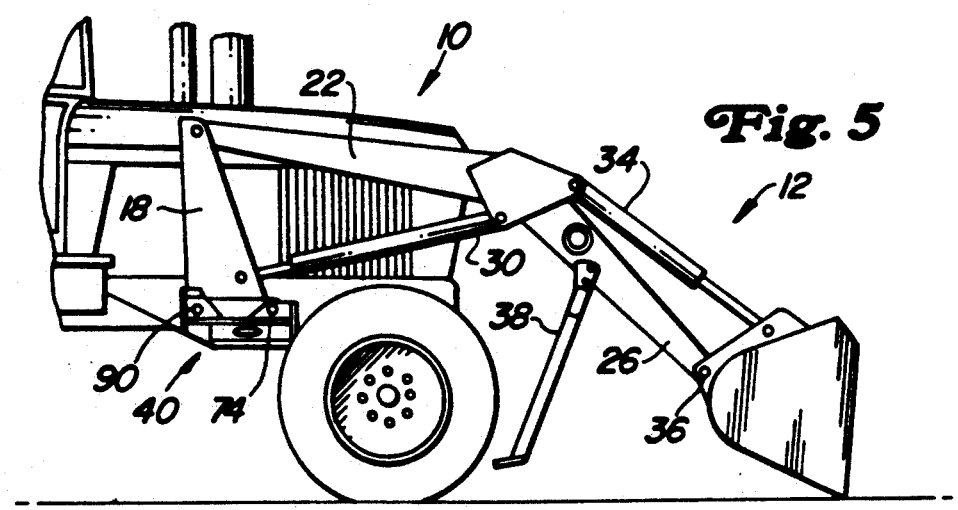
FIG. 5 is a view similar to FIG. 4 but showing the mast and attachment positioned to force the mast post end into alignment with the bracket for easy locking pin insertion or removal.

When the operator wishes to free up the tractor 10 for other uses, he drives to a level storage area and extends the cylinders 34 to move the attachment 28 to a downwardly directed or dump position approximately 45 degrees from the horizontal. The cylinders 30 are retracted to lower the attachment 28 to the ground (FIG. 1) and to remove the weight from the front of the tractor which forcibly seats the bushings 116 in the respective pockets 98 (FIGS. 11 and 12) so that the bores 88 in the locating ramp structure bushings 90 are precisely aligned with the bores 118 in the corresponding mast post bushings 116. With the tractor placed in park and the engine shut off, the parking stands 38 are released and then pivoted to and pinned in their park positions (FIG. 5). The locking pins 126 are then released and removed.

The tractor is started and the attachment cylinders 34 are retracted until the stands 38 are about 30 mm off the ground; thereafter (FIG. 4) the cylinders 30 are extended until the lower mast ends 44 move a sufficient distance rearwardly to clear the channel 104 from the pin 74. The attachment cylinders 30 are retracted completely (FIG. 3) to raise the lower mast ends 44 completely out of the mounting frames 42 as the loader 12 rocks about the feet of the parking stands 38. The cylinders 30 are then retracted completely. With the engine off, the tractor in park and the hydraulic pressure relieved, the hoses 132 and 134 are disconnected. The engine is started and the tractor is slowly backed out (FIG. 2) from the loader 12. In the parked position, the loader 12 rests on the stands 38 and attachment 28.

Having described the preferred embodiment, it will become apparent that various modifications can be made without departing from the scope of the invention as defined in the accompanying claims.

We claim:
1. In a loader for a tractor having a fore-and-aft extending frame, the loader including a pair of upright mast posts and a boom pivotally connected to the posts and extending forwardly therefrom, and an attachment pivotally connected to the boom, loader mounting structure comprising:
   a pair of support frames connected to opposite sides of the tractor frame;
   a pair of mast ends located at the lower ends of the mast posts and adapted for receipt by the support frames, the support frames providing substantially all of the support of the loader when mounted on the tractor;
   wherein each support frame comprises ramp structure including a fixed, upwardly opening pocket defining the lowermost extremity of the surface of the ramp structure, each support frame further including an aperture and a transverse shaft member offset in the fore-and-aft direction from the aperture, wherein the aperture and pocket of each support frame are fixed and non-adjustable relative to each other;
   each mast end including a channel-shaped member adapted for receipt by a respective said transverse shaft member, and a post support offset in the fore-and-aft direction from the channel-shaped member including a transversely projecting portion which conforms to the shape of and is adapted for receipt within the respective pocket upon mounting of the loader on the tractor, the mast ends, pockets and ramp structure providing both horizontal and vertical positioning of the mast posts during said mounting, each post support including an aperture which aligns with the respective support frame aperture when each post support is fully seated within the respective pocket;
   pin means for insertion through the aligned support frame and post support apertures to secure the loader to the tractor; and
   cylinder means for operating the boom and the attachment to force the post supports firmly into the pockets to assure full alignment of the apertures for facilitating insertion and removal of the pin means without tools.

2. The invention as set forth in claim 1 wherein the cylinder means includes means for moving the attachment vertically, wherein the post support is pivoted about the axis of the transverse shaft member on the support frame as the cylinder means operates.

3. The invention as set forth in claim 2 wherein the attachment and boom define a first moment arm through which forces on the attachment act as the mast posts rotate about the axis of the transverse shaft member, and wherein the mast support and pin means define with the transverse shaft member a second moment arm acting to resist said rotation, the first moment arm being several times greater than the second moment arm.

4. The invention as set forth in claim 1 wherein the transverse shaft member for each mast end is located forwardly of and generally level with the respective post support aperture, and each ramp structure surface includes transversely spaced, forwardly and upwardly directed ramp surfaces leading into the respective pocket, and wherein the transversely projecting portion for each mast support comprises a bushing for receipt within the respective pocket.

5. The invention as set forth in claim 4 wherein each bushing includes a bore having an axis and defining the respective post support aperture, and each of the pockets has an arc-shaped configuration with an axis of curvature collinear with the bore axis.

6. The invention as set forth in claim 5 wherein the bushings are round and have a bore with radius substantially equal to the radius of the pockets.

7. The invention as set forth in claim 6 wherein each support frame and each mast post comprises weldments, and wherein the pin means includes a pin shaft with a diameter approximately equal to the diameter of the bushing bore.

8. The invention as set forth in claim 1 wherein the cylinder means includes:
a first cylinder operably connected to the boom for rocking the channel-shaped member over the transverse shaft member, and a second cylinder operably connected to the attachment for rocking the attachment.

* * * * *

UNITED STATES PATENT AND TRADEMARK OFFICE
CERTIFICATE OF CORRECTION

PATENT NO. : 5,135,347

DATED : August 4, 1992

INVENTOR(S) : Edward T. Kaczmarczyk et al.

It is certified that error appears in the above-identified patent and that said Letters Patent is hereby corrected as shown below:

On the title page, insert the following:

-- [73] Assignee: Deere & Company, Moline, Ill.--

Signed and Sealed this

Twenty-third Day of November, 1993

*Attest:*

BRUCE LEHMAN

*Attesting Officer*    *Commissioner of Patents and Trademarks*